L. T. OLSON.
DRAFT APPARATUS.
APPLICATION FILED MAY 19, 1916.
1,221,086.
Patented Apr. 3, 1917.
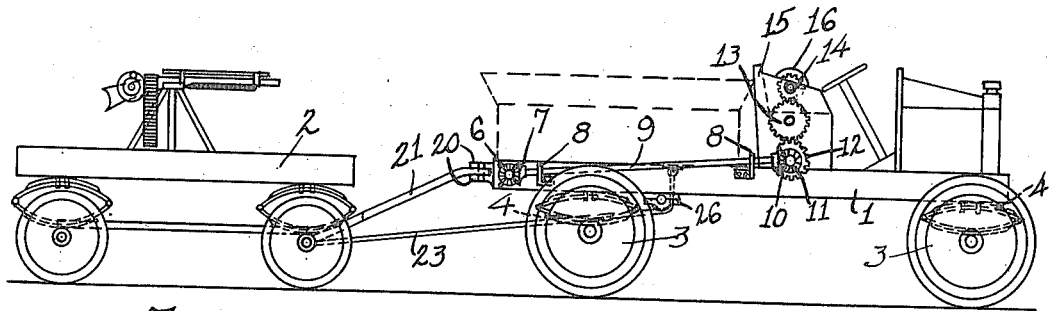
Fig. 1.
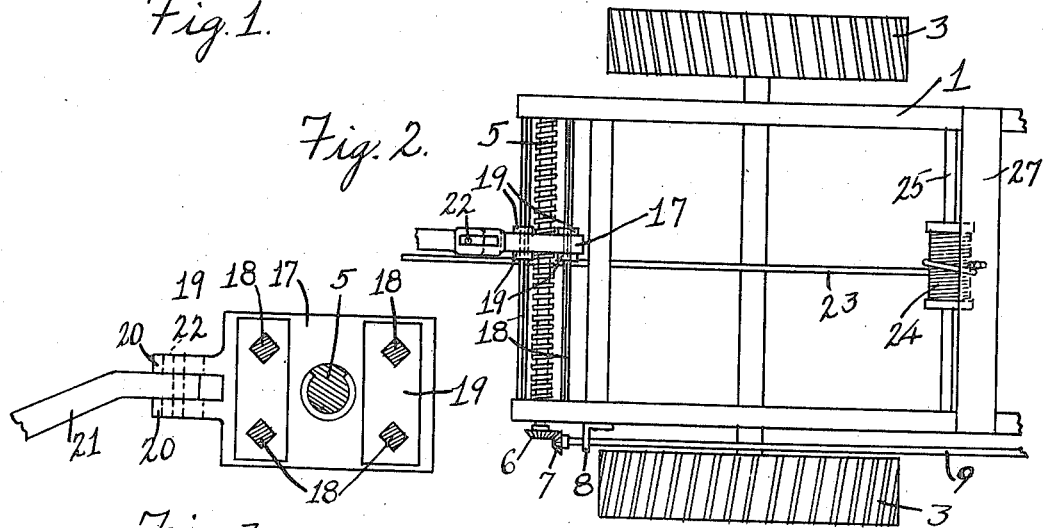
Fig. 2.
Fig. 3.
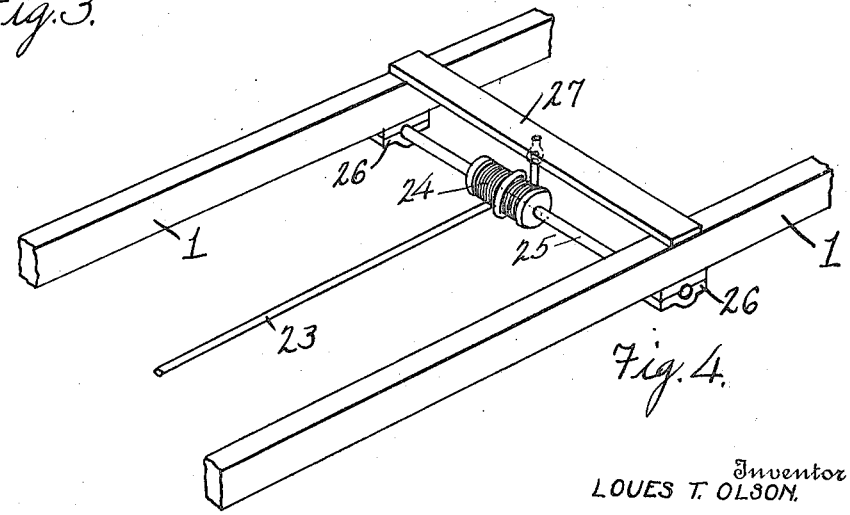
Fig. 4.
Inventor
LOUES T. OLSON.
Witness
By Charles E. Winy.
Attorney

UNITED STATES PATENT OFFICE.

LOUES T. OLSON, OF DETROIT, MICHIGAN.

DRAFT APPARATUS.

1,221,086.   Specification of Letters Patent.   Patented Apr. 3, 1917.

Application filed May 19, 1916. Serial No. 98,512.

*To all whom it may concern:*

Be it known that I, LOUES T. OLSON, a citizen of the United States, residing at Detroit, county of Wayne, State of Michigan, have invented a certain new and useful Improvement in Draft Apparatus, and declare the following to be a full, clear, and exact description of the same, such as will enable others skilled in the art to which it pertains to make and use the same, reference being had to the accompanying drawings, which form a part of this specification.

This invention relates to draft apparatus for trailers adapted for attachment to the rear end of automobiles and automobile trucks. At the present time trailers of the common type are fairly efficient but cannot be operated with the ease and exactness required. The trailer herein described has been provided with means for overcoming the difficulties common to ordinary trailers, and its object is a simple and efficient means by which the operator of the truck can operate and control the movement of the trailer. Another object is the means of attaching the trailer to the truck in such a way that the strain on the truck comes at about the center thereof. These and other objects and the several novel features of the invention in its preferred form are hereinafter more fully described and claimed and shown in the accompanying drawings in which—

Figure 1 is a somewhat diagrammatic view of the device showing the truck and trailer in elevation, the trailer in this view having a machine gun or the like mounted thereon, and a box is shown in dotted lines mounted on the rear end of the truck.

Fig. 2 is an enlarged plan view of the rear end of the truck showing the connections partly broken away between the truck and the trailer, but not showing the trailer.

Fig. 3 is a view of the traveling nut taken on line *x—x* of Fig. 2 and showing the mounting of the nut and the attachment of the tongue of the trailer thereto.

Fig. 4 is a perspective view of the means of attaching the cable, which connects with the trailer, to the truck.

Similar characters refer to similar parts throughout the drawing and specification.

The truck may be of any approved form, preferably of the selfpropelled type, including a power plant (not here shown), but of the type now well known in the art.

I have shown the truck connected to the trailing vehicle 2, on which I have shown a machine gun of the ordinary type. The truck consists of the ordinary frame 1 mounted on the wheels 3 and the springs 4. At the rear end of the frame is mounted a screw shaft 5, which passes through the frame and ends in the bevel gear 6. The bevel gear 6 meshes with the bevel gear 7 mounted on one end of the shaft 9, which bears in the brackets 8. The rod 9 on which the bevel gear 7 is mounted is provided at the other end thereof with the bevel gear 10 engaging in mesh with the bevel gear 11, which at the rear thereof is provided with a gear 12 meshing with the gear 13, which is the intermediate gear between the gears 12 and 14. The gear 14 is mounted on a short jack shaft which passes through the arm of the seat 15 and is provided on the inside thereof with the hand wheel 16. By turning the hand wheel 16, the gear 14 is turned, which turns the gear 13, the gear 12 and the bevel gear 11, which turns the gear 10 and the shaft 9 on which the gear 7 is mounted. The gear 7 turns the bevel gear 6 keyed to the screw shaft 5, and upon rotation of the screw shaft 5 the block 17 which is threaded internally to receive the screw shaft 5 is moved laterally of the truck frame.

The block 17 rides on the four square rods 18 and is provided with side plates 19 on each side thereof, through which the rods 18 project to form a larger bearing surface for the block 17 on the rods 18.

At the rear of the block 17 the two lugs 20 are provided, which engage over the tongue 21 of the trailer, said tongue 21 being held in place between the lugs 20 by the pin 22.

The tongue 21 of the trailer is connected to the forward axle thereof, and upon movement of the block 17 laterally in the truck frame, the tongue 21 of the trailer is also moved and thus turns the forward wheels of the trailer 2. The block 17 is mounted somewhat loosely on the screw shaft 5, but bears on the rods 18 sufficiently tight so that the rods 18 take the side strain of the block 17, and thus leave the screw shaft 5 free to turn. With no other means here provided the full strain of pulling the trailer would come on the pin 22. To take up this strain I have provided the cable 23 attached to the forward axle of the trailer and wound around the drum 24 mounted on the shaft 25, which is held in the bearings 26 mounted on the truck frame and is attached at the forward end thereof to the cross bar 27 of the truck frame. Thus when the truck is in motion the strain comes on the cross member 27 of the truck and thus leaves the tongue 21 of the trailer free to lateral movement across the rear of the truck frame.

By the arrangement herein described it will be seen that the operator of the truck may drive the truck forward, backward or turn to the right or left by operating the hand wheel 16 and turning the front axle and wheels of the trailer in the direction he wishes to move, thus facilitating operation of the trailer for movement in any direction desired. From the foregoing description it becomes evident that the operator of the truck may control the movement of the trailer as described without changing his position from the seat of the truck, the controlling parts being of easy access to the operator and, by the addition of the described parts to a self propelled vehicle, additional loads may be readily, easily and efficiently handled by one operator.

Having thus described my invention its utility and mode of operation what I claim and desire to secure by Letters Patent of the United States is—

1. In a draft apparatus, a driven vehicle, a trailing vehicle, means for guiding said trailing vehicle from the driven vehicle, a cross bar on the driven vehicle, a shaft directly beneath said cross bar, a cable and a drum rotatable on the said shaft around which the said cable is wound, one end of the cable being secured to said cross bar and the other end of the cable being secured to the trailing vehicle.

2. In a draft apparatus, a driven vehicle, a trailing vehicle, a cable connecting the said vehicles, a tongue on the said trailing vehicle, a screw shaft at the rear of the driven vehicle, a block on said screw shaft adapted to receive the tongue of the said trailer, means on said block allowing limited movement of the trailer tongue in relation thereto, a plurality of rods passing through said block on each side of the shaft, the bearing between the block and rods being greater in length than the bearings between the block and screw shaft, said rods preventing rotation of the block by rotation of the shaft, and means for rotating said shaft.

3. In a draft apparatus, a driven vehicle, a trailing vehicle, a cross bar on the driven vehicle, a shaft directly beneath said cross bar, a cable and a drum rotatable on the said shaft around which the said cable is wound, one end of the cable being secured to said cross bar and the other end of the cable being secured to the trailing vehicle, a screw shaft at the rear of the driven vehicle, a block on said screw shaft adapted to receive the tongue of the said trailer, means on said block allowing limited movement of the trailer tongue in relation thereto, a plurality of rods passing through said block on each side of the shaft, the bearing between the block and rods being greater in length than the bearing between the block and screw shaft, said rods preventing rotation of the block by rotation of the shaft, and means for rotating said shaft.

In testimony whereof, I sign this specification.

LOUES T. OLSON.